US012671131B2

(12) United States Patent
Hidaka et al.

(10) Patent No.: US 12,671,131 B2
(45) Date of Patent: Jun. 30, 2026

(54) OUTER PACKAGE AND BATTERY

(71) Applicant: TOYOTA JIDOSHA KABUSHIKI KAISHA, Toyota (JP)

(72) Inventors: Yutaka Hidaka, Toyota (JP); Yuka Nagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 578 days.

(21) Appl. No.: 17/740,929

(22) Filed: May 10, 2022

(65) Prior Publication Data

US 2022/0384882 A1    Dec. 1, 2022

(30) Foreign Application Priority Data

Jun. 1, 2021    (JP) .................................. 2021-092056

(51) Int. Cl.
H01M 50/102        (2021.01)
(52) U.S. Cl.
CPC .................................. H01M 50/102 (2021.01)
(58) Field of Classification Search
CPC ............. H01M 50/102; H01M 50/105; H01M 50/474; H01M 50/548; Y02E 60/10
See application file for complete search history.

(56) References Cited

U.S. PATENT DOCUMENTS

2004/0038125 A1* 2/2004 Kim .................... H01M 50/186
                                                      429/185
2009/0263712 A1* 10/2009 Mizuta ................ H01M 50/557
                                                      429/177
2018/0309092 A1* 10/2018 Fujishima ......... H01M 10/0404

FOREIGN PATENT DOCUMENTS

CN          109103508 A    12/2018
JP          2004-039271 A    2/2004
JP          2009-170379 A    7/2009
JP          2020-013637 A    1/2020
JP          2020-173989 A    10/2020
KR     10-2017-0091938 A    8/2017
KR     10-2018-0102927 A    9/2018

OTHER PUBLICATIONS

Machine translation of Japanese Patent Publication No. JP 2009-170379, published Jul. 30, 2009. (Year: 2009).*

* cited by examiner

*Primary Examiner* — Miriam Stagg
*Assistant Examiner* — Lilia Nedialkova
(74) *Attorney, Agent, or Firm* — Dinsmore & Shohl LLP

(57)        ABSTRACT

The present disclosure is directed to a laminate-type outer package including a convex structure including a space to seal a power generating element. The convex structure includes a top surface including a first side, a second side, and a connection part that connects the first side and the second side. The outer package includes a first extension part that extends from a first crossing part where the connection part and the first side cross, a second extension part that extends from a second crossing part where the connection part and the second side cross, and an extension crossing part that connects the first extension part and the second extension part. The extension crossing part is lower than the top surface in a thickness direction. The outer package includes a tapered surface including the connection part, the first extension part and the second extension part as an outer periphery.

19 Claims, 8 Drawing Sheets

FIG. 1A
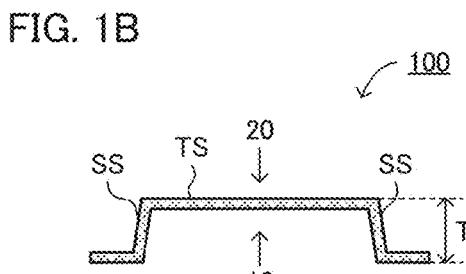
FIG. 1B
FIG. 2A
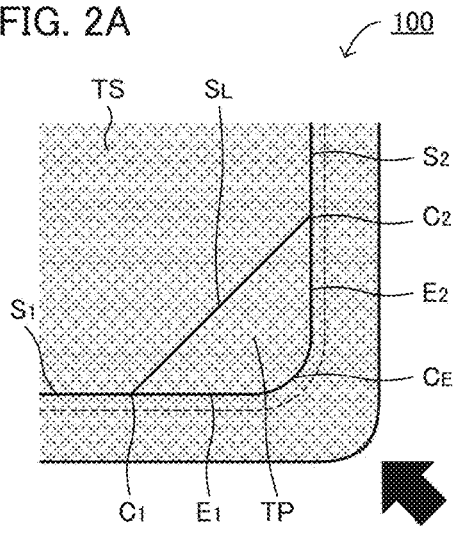
FIG. 2B
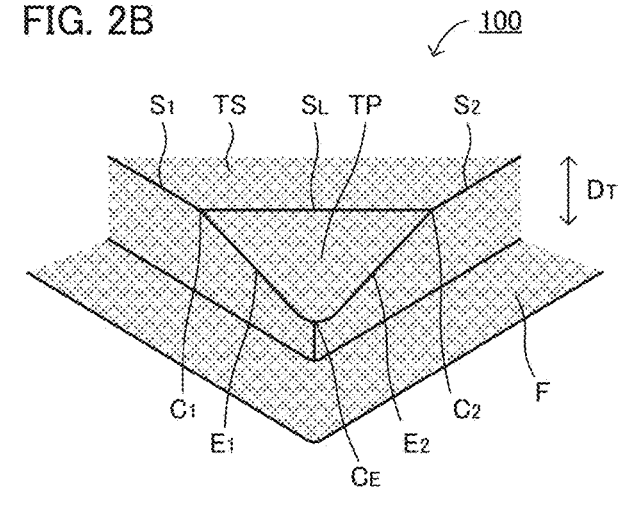

FIG.
3A
FIG. 3B
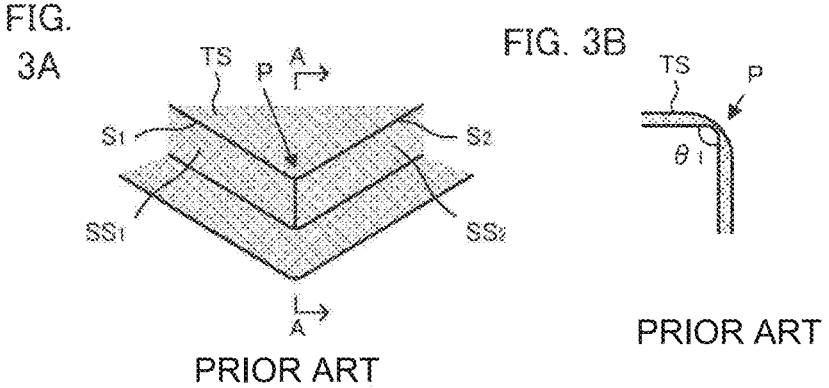
PRIOR ART
PRIOR ART
FIG. 4A
FIG. 4B
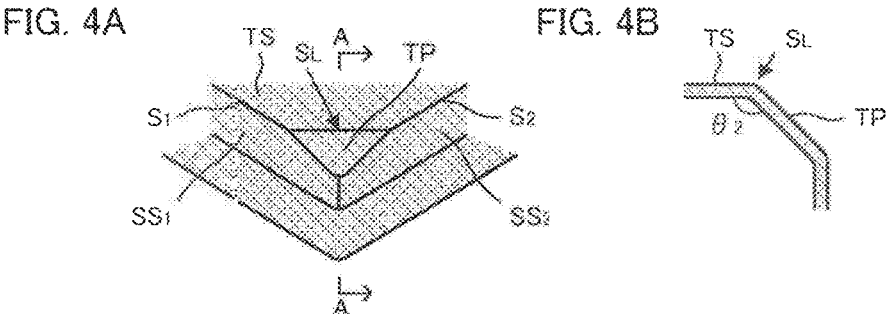

FIG. 11A
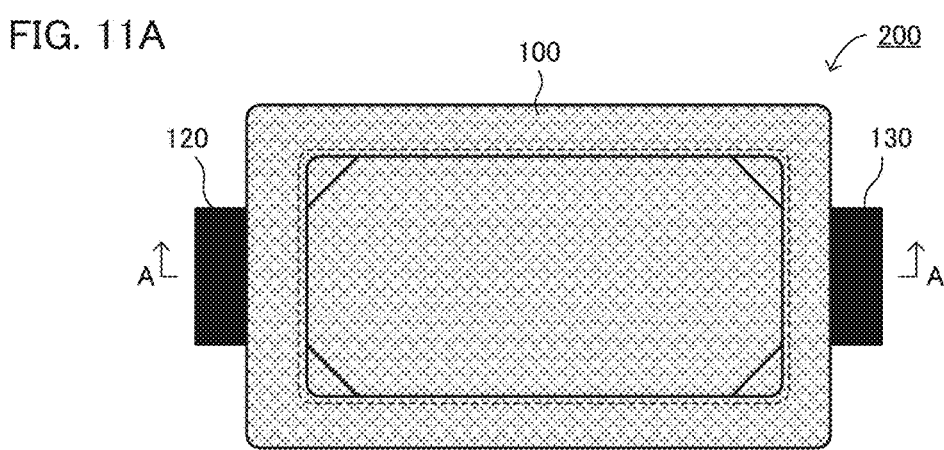
FIG. 11B
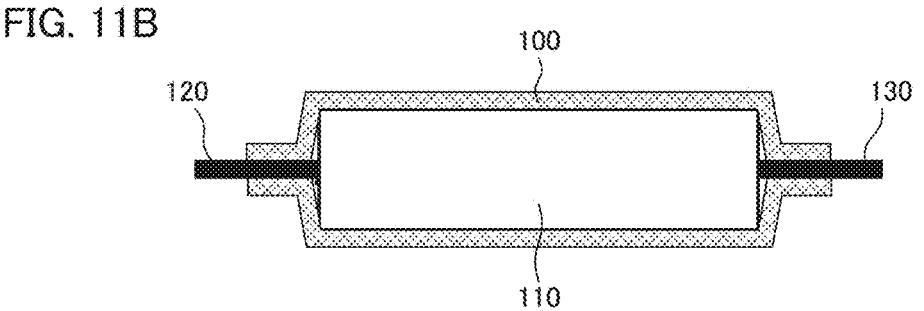
FIG. 12A
FIG. 12B
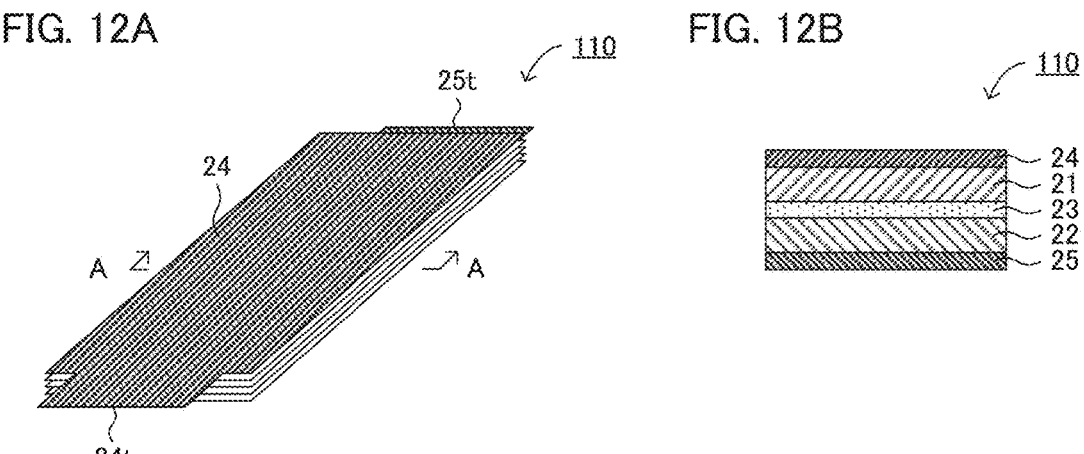

OUTER PACKAGE AND BATTERY

CROSS REFERENCE TO RELATED APPLICATION

This application claims priority to Japanese Patent Application No. 2021-092056 filed on Jun. 1, 2021, the entire contents of which are incorporated by reference herein.

TECHNICAL FIELD

The present disclosure relates to an outer package and a battery.

BACKGROUND

In recent years, lithium ion batteries have been put into practical use as high-voltage and high-energy density batteries. Also, as one of the forms of such a battery, a battery in which a power generating element is sealed by a laminate film (laminate-type outer package) has been known. For example, Patent Literature 1 discloses a sealing structure of a battery outer package case comprising a laminate film covering both surfaces of a polygonal power generating element in which a cathode plate and an anode plate are layered interposing a separator. Also, Patent Literature 1 discloses that generation of wrinkles in a corner part of the laminate film is inhibited by arranging the spacer to fill in a space between the corner part of the laminate film and a corner part of the power generating element.

CITATION LIST

Patent Literature

Patent Literature 1: Japanese Patent Application Laid-Open (JP-A) No. 2004-39271

SUMMARY

Technical Problem

In a laminate-type outer package, a convex structure including a space to seal a power generating element may be formed. In a corner of the convex structure, breakage of the outer package is easily generated. "Corner of the convex structure" refers to, as exemplified in later described FIGS. 3A, 3B, 4A and 4B, a boundary region between a first side surface $SS_1$ including a top surface $TS$ and a first side $S_1$, and a second side surface $SS_2$ including a second side $S_2$.

The present disclosure has been made in view of the above circumstances, and a main object thereof is to provide an outer package in which a breakage that occurs in a corner of a convex structure is inhibited.

Solution to Problem

The present disclosure provides a laminate-type outer package to be used for a battery, the outer package comprising: a convex structure including a space to seal a power generating element; wherein the convex structure includes a top surface; in a plan view, the top surface includes a first side, a second side that extends to a direction crossing to the first side, and a connection part that connects the first side and the second side; in a plan view, the outer package includes a first extension part that extends from a first crossing part where the connection part and the first side are crossed, a second extension part that extends from a second crossing part where the connection part and the second side are crossed, and an extension crossing part that connects the first extension part and the second extension part; the extension crossing part is in a position lower than that of the top surface in a thickness direction; and the outer package includes a tapered surface including the connection part, the first extension part and the second extension part as an outer periphery.

According to the present disclosure, the tapered surface is arranged, and thus a breakage that occurs in a corner of a convex structure is inhibited in the outer package.

In the disclosure, the connection part may include a straight line part in a plan view.

In the disclosure, in a plan view, the first side and the first extension part may be parallel, and the second side and the second extension part may be parallel.

In the disclosure, the tapered surface may include a mountain fold part.

The present disclosure also provides a battery comprising a power generating element and an outer package sealing the power generating element, wherein the outer package is the above described laminate-type outer package.

According to the present disclosure, the above described outer package is used, and thus the battery may have high structural reliability.

In the disclosure, the battery may further comprise: a spacer arranged to fill in a space between the power generating element and the outer package; wherein the spacer may include a corresponding tapered surface capable of surface contact with the tapered surface in the outer package; and the tapered surface and the corresponding tapered surface may be arranged to oppose to each other.

In the disclosure, the spacer may include a holder part that fixes a tab of the power generating element.

Advantageous Effects of Disclosure

The outer package in the present disclosure exhibits an effect of inhibiting a breakage that occurs in a corner of a convex structure.

BRIEF DESCRIPTION OF DRAWINGS

FIG. 1A is a schematic plan view and FIG. 1B is a schematic cross-sectional view, exemplifying the outer package in the present disclosure.

FIG. 2A is a schematic plan view and FIG. 2B is a schematic perspective view, exemplifying the outer package in the present disclosure.

FIG. 3A is a schematic perspective view and FIG. 3B is a schematic cross-sectional view, exemplifying a conventional convex structure.

FIG. 4A is a schematic perspective view and FIG. 4B is a schematic cross-sectional view, exemplifying the convex structure in the present disclosure.

FIG. 11A is a schematic plan view and FIG. 11B is a schematic cross-sectional view, exemplifying the battery in the present disclosure.

FIG. 12A is a schematic perspective view and FIG. 12B is a schematic cross-sectional view, exemplifying the power generating element in the present disclosure.

DETAILED DESCRIPTION

Figure 5:
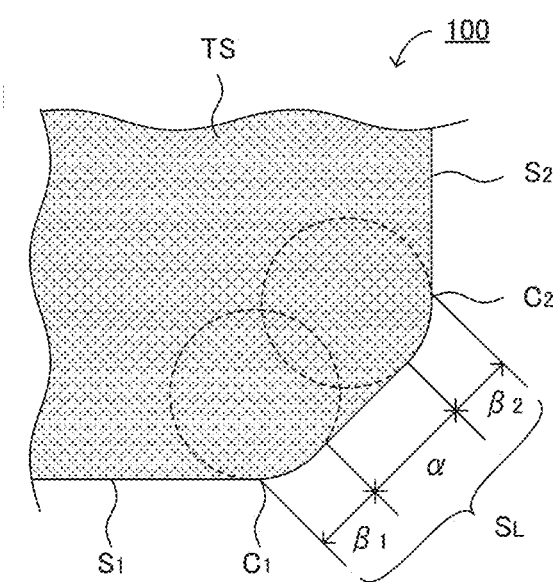
FIG. 5 is a schematic plan view exemplifying the connection part in the present disclosure.

The outer package and the battery in the present disclosure will be hereinafter explained in details. Each drawing described as below is a schematic view, and the size and the shape of each portion are appropriately exaggerated in order to be understood easily. Further, in each drawing, hatchings or reference signs are appropriately omitted.

A. Outer Package

FIG. 1A is a schematic plan view exemplifying the outer package (laminate-type outer package for battery) in the present disclosure, and FIG. 1B is a cross-sectional view of A-A in FIG. 1A. Also, FIG. 2A is an enlarged view of the region X in FIG. 1A, and FIG. 2B is a perspective view of the outer package observed from the arrow direction in FIG. 2A.

As shown in FIGS. 1A and 1B, outer package 100 comprises convex structure 20 including space 10 to seal a power generating element (not illustrated). Further, the convex structure 20 includes top surface TS. Also, as shown in FIG. 2A, the top surface TS includes first side $S_1$, second side $S_2$ that extends to a direction crossing to the first side $S_1$, and connection part $S_L$ that connects the first side $S_1$ and the second side $S_2$. Also, as shown in FIG. 2A, the outer package 100 includes first extension part $E_1$ that extends from first crossing part $C_1$ where the connection part $S_L$ and the first side $S_1$ are crossed, second extension part $E_2$ that extends from second crossing part $C_2$ where the connection part $S_L$ and the second side $S_2$ are crossed, and extension crossing part $C_E$ that connects the first extension part $E_1$ and the second extension part $E_2$. Also, as shown in FIG. 2B, the extension crossing part $C_E$ is in a position lower than that of the top surface TS in thickness direction $D_T$. Also, as shown in FIGS. 2A and 2B, the outer package includes tapered surface TP including the connection part $S_L$, the first extension part $E_1$ and the second extension part $E_2$ as an outer periphery. The tapered surface TP is tapered from the connection part $S_L$ to the extension crossing part $C_E$.

According to the present disclosure, the tapered surface is arranged, and thus a breakage that occurs in a corner of a convex structure is inhibited in the outer package. As described above, breakage of the outer package easily occurs in the corner of the convex structure. Here, FIG. 3A is a schematic perspective view exemplifying a conventional convex structure, and FIG. 3B is a cross-sectional view of A-A in FIG. 3A. As shown in FIG. 3A, in the conventional convex structure, there is top P where top surface TS, first side surface $SS_1$ including first side $S_1$, and second surface $SS_2$ including second side $S_2$ contact with each other.

The convex structure of the outer package is usually formed by conducting an emboss processing (flange processing) to a laminate film. On this occasion, as shown in FIG. 3B, the top P becomes the thinnest due to stress during pressing, and breakage (such as crack and hole) is easily generated in the outer package. Further, when members (such as a power generating element and a spacer) sealed in the space inside the outer package interfere with the outer package due to heat shock (thermal stress) during usage of the battery and due to expansion and contraction of the power generating element along with charge and discharge, stress concentration occurs particularly in the top P. The breakage of the outer package would be easily generated also due to such a stress concentration.

In contrast, in the present disclosure, a tapered surface is arranged in the corner of the convex structure. Here, FIG. 4A is a schematic perspective view exemplifying the convex structure in the present disclosure, and FIG. 4B is a cross-sectional view of A-A in FIG. 4A. As shown in FIG. 4A, tapered surface TP is formed by folding from the top surface TS setting the connection part $S_L$ as a border. In FIG. 3A, stress during pressing is concentrated at a point which is the top P, but in FIG. 4A, stress during pressing is dispersed to a line which is the connection part $S_L$. Further, as shown in FIG. 3B, folding angle $\theta_1$ at the top P is comparatively large, but as shown in FIG. 4B, folding angle $\theta_2$ in the connection part $S_L$ is comparatively small since there is the tapered surface TP. For these reasons, thinning of the connection part $S_L$ due to stress during pressing is inhibited, and the breakage of the outer package is not easily generated.

Further, even when members (such as a power generating element and a spacer) sealed in the space inside the outer package interfere with the outer package due to heat shock (thermal stress) during usage of the battery and due to expansion and contraction of the power generating element along with charge and discharge, stress is dispersed to the tapered surface TP which is a surface, not the point P that is a point, and thus the breakage of the outer package due to stress concentration does not easily occur. Also, as described later, when a spacer including a corresponding tapered surface capable of surface contact with the tapered surface is used, the breakage of the outer package due to stress concentration is remarkably inhibited.

Also, as described above, Patent Literature 1 discloses that generation of wrinkles in a corner part of the laminate film is inhibited by arranging the spacer to fill in a space between the corner part of the laminate film and a corner part of the power generating element. Although the generation of wrinkles may be inhibited by arranging the spacer, the corner of the convex structure is the same as the structure shown in FIG. 3A, and thus it is difficult to inhibit the breakage of the outer package.

The outer package in the present disclosure will be hereinafter explained in more details. As shown in FIG. 1B, outer package 100 comprises convex structure 20 including space 10 to seal a power generating element (not illustrated). The convex structure 20 includes top surface TS and side surface SS, and the space 10 is a space formed by the top surface TS and the side surface SS. The top surface TS may be in a plane shape, and may be a curved shape.

As shown in FIGS. 2A and 2B, the top surface TS includes first side $S_1$, and second side $S_2$ that extends to a direction crossing to the first side $S_1$. Each of the first side $S_1$ and the second side $S_2$ may include a straight line part, may include a curved line part, and may include a straight line part and a curved line part. An angle (acute angle side) formed by, a direction to which the straight line part of the first side $S_1$ extends, and a direction to which the straight line part of the second side $S_2$ extends, is 60° or more and 90° or less, for example.

As shown in FIGS. 2A and 2B, the top surface TS includes connection part $S_L$ that connects the first side $S_1$ and the second side $S_2$. In embodiments, the connection part $S_L$ includes at least a straight line part. Also, in embodiments, the connection part $S_L$ includes a curved line part in at least one of the edges of the straight line part. The reason therefor is to prevent thinning of the outer package due to stress during pressing. For example, as shown in FIG. 5, the connection part $S_L$ includes, in the order from the first side $S_1$ side, curved line part $\beta_1$, straight line part $\alpha$ and curved line part $\beta_2$. The length of the connection part $S_L$ is, for example, 3 mm or more and may be 10 mm or more. Meanwhile, the length of the connecting part $S_L$ is, for example, 20 mm or less.

As shown in FIG. 5, the curved line part $\beta_1$ may be connected to the first side $S_1$ at the first crossing part $C_1$. The curved line part $\beta_1$ may approximate a circular arc of an imaginary circle. The radius of the imaginary circle (radius of curvature of curved line part W is, for example, 0.5 mm or more, and may be 2 mm or more. The center angle of the circular arc (circular arc of the imaginary circle) corresponding to the curved line part $\beta_1$ is, for example, 20° or more and 70° or less, and may be 30° or more and 60° or less.

As shown in FIG. 5, one edge of the straight line part $\alpha$ may be connected to the curved line part $\beta_1$, and the other edge of the straight line part $\alpha$ may be connected to the curved line part $\beta_2$. Although not particularly illustrated, one edge of the straight line part $\alpha$ may be connected to the first side $S_1$ at the first crossing part $C_1$. Likewise, the other edge of the straight line part $\alpha$ may be connected to the second side $S_2$ at the second crossing part $C_2$. The length of the straight line part $\alpha$ is, for example, 1 mm or more, may be 2 mm or more, and may be 3 mm or more. Also, in embodiments, the straight line part $\alpha$ includes a central point of the connection part $S_L$ (a point positioned at the half length of the whole length of the connection part $S_L$).

As shown in FIG. 5, the curved line part $\beta_2$ may be connected to the second side $S_2$ at the second crossing part $C_2$. The curved line part $\beta_2$ may approximate a circular arc of an imaginary circle. The radius of the imaginary circle (radius of curvature of curved line part $\beta_2$) is, for example, 0.5 mm or more, and may be 2 mm or more. The center angle of the circular arc (circular arc of the imaginary circle) corresponding to the curved line part $\beta_2$ is, for example, 20° or more and 70° or less, and may be 30° or more and 60° or less. The radius of the imaginary circle in the curved line part $\beta_2$ and the radius of the imaginary circle in the curved line part $\beta_1$ may be the same and may be different. Likewise, the center angle of the circular arc corresponding to the curved line part $\beta_2$ and the center angle of the circular arc corresponding to the curved line part $\beta_1$ may be the same and may be different.

Figure 6A:
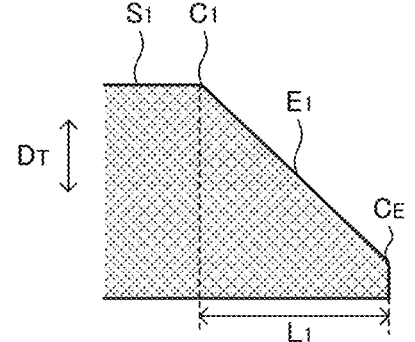
FIGS. 6A and 6B are schematic side views exemplifying the extension part in the present disclosure.

As shown in FIGS. 2A and 2B, outer package 100 includes, in a plan view, first extension part $E_1$ that extends from first crossing part $C_1$ where connection part $S_L$ and first side $S_1$ are crossed. In embodiments, the first extension part $E_1$ includes a straight line part. Also, in embodiments, the first side $S_1$ and the first extension part $E_1$ are parallel. In specific, in embodiments, a direction to which the straight line part in the first side $S_1$ extends, and a direction to which the straight line part in the first extension part $E_1$ extends, are parallel. In the present disclosure, parallel means that the angle (acute-angle side) formed of the two directions is 30° or less, and it may be 15° or less. Also, FIG. 6A is a schematic side view of the outer package in the present disclosure. As shown in FIG. 6A, $L_1$ designates a length of the first extension part $E_1$ in a direction crossing the thickness direction $D_T$. $L_1$ is, for example, 2 mm or more and may be 7 mm or more. Meanwhile, $L_1$ is, for example, 15 mm or less.

Figure 6B:
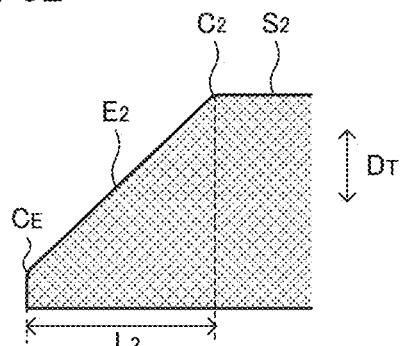

As shown in FIG. 2A, outer package 100 includes, in a plan view, second extension part $E_2$ that extends from second crossing part $C_2$ where connection part $S_L$ and second side $S_2$ are crossed. In embodiments, the second extension part $E_2$ includes a straight line part. Also, in embodiments, the second side $S_2$ and the second extension part $E_2$ are parallel. In specific, in embodiments, a direction to which the straight line part in the second side $S_2$ extends, and a direction to which the straight line part in the second extension part $E_2$ extends, are parallel. Also, FIG. 6B is a schematic side view of the outer package in the present disclosure. As shown in FIG. 6B, $L_2$ designates a length of the second extension part $E_2$ in a direction crossing the thickness direction $D_T$. $L_2$ is, for example, 2 mm or more and may be 7 mm or more. Meanwhile, $L_2$ is, for example, 15 mm or less. $L_1$ and $L_2$ may be the same and may be different.

As shown in FIGS. 2A and 2B, outer package 100 includes extension crossing part $C_E$ that connects the first extension part $E_1$ and the second extension part $E_2$. In embodiments, the shape of the extension crossing part $C_E$ in a plan view is R shape. Also, as shown in FIG. 2B, the extension crossing part $C_E$ is in a position lower than that of the top surface TS in thickness direction $D_T$. Also, the extension crossing part $C_E$ in FIG. 2B is, in the thickness direction $D_T$, in a position higher than the position of flange surface F, but may be in the same position as that of the flange surface F.

Figure 7A:
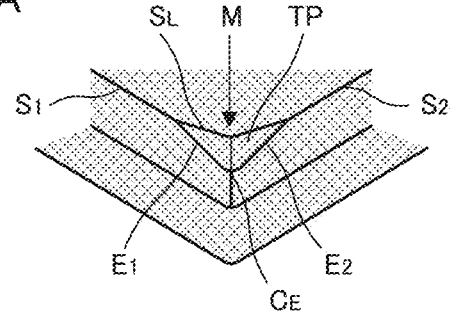
FIGS. 7A and 7B are schematic perspective views exemplifying the tapered surface in the present disclosure.
Figure 7B:
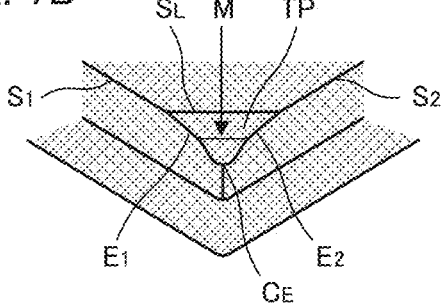

As shown in FIGS. 2A and 2B, the outer package 100 includes tapered surface TP including connection part $S_L$, the first extension part $E_1$ and the second extension part $E_2$ as an outer periphery. The tapered surface TP may be in a plane shape, and may be in a curved shape. Also, the tapered surface TP may include a mountain fold part. For example, as shown in FIG. 7A, the tapered surface TP may include mountain fold part M, of which one edge is connected to the connection part $S_L$, and the other edge is connected to the extension crossing part $C_E$. Also, as shown in FIG. 7B, the tapered surface TP may include mountain fold part M, of which one edge is connected to the first extension part $E_1$, and the other edge is connected to the second extension part $E_2$. The mountain fold part M may include a straight line part, may include a curved line part, and may include a straight line part and a curved line part.

Also, the outer package in the present disclosure may include just one of the tapered surface, and may include a plurality of the tapered surface. For example, the top surface TS shown in FIG. 1A includes: side $R_1$; side $R_2$ that extends to a direction crossing to the side $R_1$; side $R_3$ opposing to the side $R_1$; and side $R_4$ crossing to the side $R_1$ as well as opposing to the side $R_2$. In the descriptions so far, the side $R_1$ has been regarded as the first side, and the side $R_2$ has been regarded as the second side. However, it is not limited to this example, and the side $R_1$ may be regarded as the first side, the side $R_2$ may be regarded as the second side, and further, the side $R_2$ may be regarded as the first side, and the side $R_3$ may be regarded as the second side. In this case, the outer package includes two of the tapered surface. In this manner, the outer package in the present disclosure may include a plurality of the tapered surface. Also, when the top surface TS shown in FIG. 1A includes the side $R_1$, the side $R_2$, the side $R_3$ and the side $R_4$, the convex structure includes four corners. Among the four corners, the tapered surface may be formed in one of them, may be formed in two of them, may be formed in three of them, and may be formed in four of them.

Also, as shown in FIG. 1B, T designates the height of the convex structure 20. The height T of the convex structure 20 is not particularly limited, but in embodiments, is 3 mm or more. The larger the T is, the more easily the stress during pressing concentrates. In contrast, in the present disclosure, the tapered surface is arranged, and thus thinning of the thickness of the convex structure in the connection part $S_L$ is effectively inhibited, even when the height T is large. Meanwhile, the height T of the convex structure 20 is, for example, 15 mm or less.

Figure 8A:
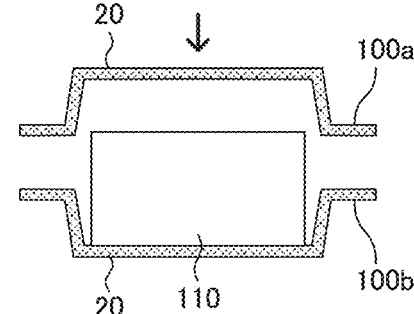
FIGS. 8A and 8B are schematic cross-sectional views exemplifying the outer package in the present disclosure.
Figure 8B:
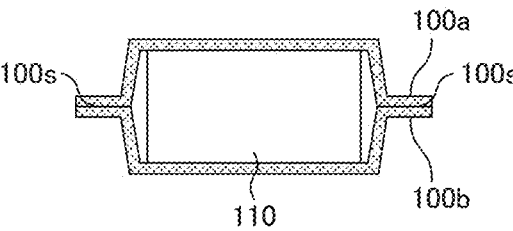
Figure 9A:
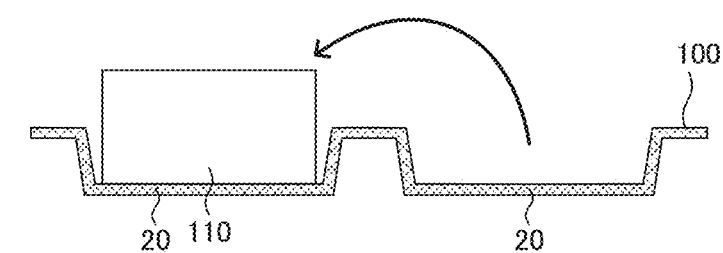
FIGS. 9A and 9B are schematic cross-sectional views exemplifying the outer package in the present disclosure.
Figure 9B:
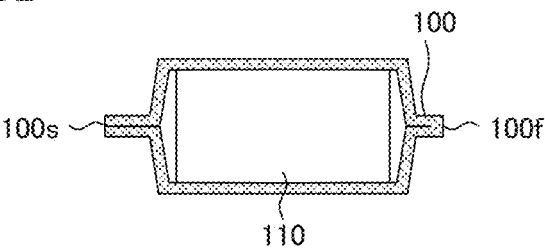

The outer package in the present disclosure may include one of the above described convex structure, and may include two. For example, as shown in FIGS. 8A and 8B, each of outer packages 100*a* and 100*b* may include one of the convex structure 20. In FIGS. 8A and 8B, power generating element 110 is sealed by two outer packages, the outer packages 100*a* and 100*b*. In this case, the outer package 100*a* and the outer package 100*b* are bonded in sealing part 100*s*. Meanwhile, for example, as shown in FIGS. 9A and 9B, outer package 100 may include two of the convex structure 20. In FIGS. 9A and 9B, power generating element 110 is sealed by one outer package 100. In this case, as shown in FIG. 9B, a part positioned between two of the convex structure 20 is fold part 100*f*. Incidentally, the outer package 100 shown in FIG. 9A is a concave structure in a strict sense, but it would be equal to the convex structure if the concave structure is rotated upside down.

Figure 10:
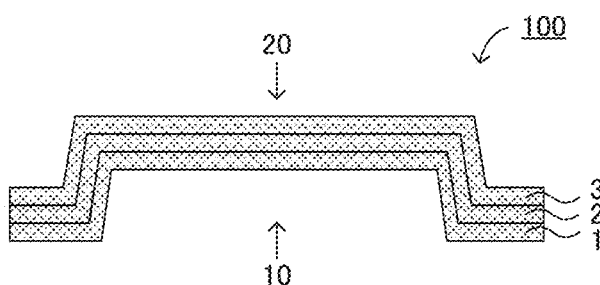
FIG. 10 is a schematic cross-sectional view exemplifying the outer package in the present disclosure.

The outer package in the present disclosure is a laminate-type outer package. The laminate-type outer package has a structure in which a thermally weldable layer and a metal layer are laminated. For example, outer package 100 shown in FIG. 10 includes, in the order along with the thickness direction, thermally weldable layer 1, metal layer 2, and resin layer 3. Examples of the material for the thermally weldable layer 1 may include an olefin-based resin such as polypropylene (PP) and polyethylene (PE). Examples of the material for the metal layer 2 may include aluminum, an aluminum alloy, and stainless steel. Examples of the material for the resin layer 3 may include polyethylene terephthalate (PET) and nylon. The thickness of the thermally weldable layer 1 is, for example, 40 μm or more and 100 μm or less. The thickness of the metal layer 2 is, for example, 30 μm or more and 60 μm or less. The thickness of the resin layer 3 is, for example, 25 μm or more and 60 μm or less.

The outer package in the present disclosure is usually used for a battery. Details of battery will be described later. Also, there are no particular limitations on the method for producing the outer package in the present disclosure, and examples thereof may include a production method including an emboss processing step of forming the convex structure by conducting an emboss processing (flange processing) to a laminate film. Also, as a mold to be used in the emboss processing, usually, a mold including a shape corresponding to the tapered surface is used. In the emboss processing, usually, a laminate film (laminate sheet) is placed between a male mold and a female mold, and then pressed to form a convex structure. In each of the male mold and the female mold, the shape corresponding to the tapered surface is formed. There are no particular limitations on the conditions for pressing, and usual conditions may be used.

B. Battery

FIG. 11A is a schematic plan view exemplifying the battery in the present disclosure, and FIG. 11B is a cross-sectional view of A-A in FIG. 11A. Battery (laminate battery) 200 shown in FIGS. 11A and 11B includes power generating element 110 and outer package 100 sealing the power generating element 110. Further, the battery 200 includes: cathode terminal 120 that is electronically connected to a cathode tab (not illustrated) inside the outer package 100 and that also extends until the outside of the outer package 100; and anode terminal 130 that is electronically connected to an anode tab (not illustrated) inside the outer package 100 and that also extends until the outside of the outer package 100. In the present disclosure, the above described outer package is used as the outer package 100.

According to the present disclosure, the above described outer package is used, and thus the battery may have high structural reliability.

1. Outer Package

The outer package in the present disclosure is a member to seal a power generating element. The outer package in the present disclosure is in the same contents as those described in "A. Outer package" above; thus, the descriptions herein are omitted.

2. Power Generating Element

A power generating element is a member to be sealed in a space inside the outer package. FIG. 12A is a schematic perspective view exemplifying the power generating element in the present disclosure, and FIG. 12B is a cross-sectional view of A-A in FIG. 12A. Power generating element 110 illustrated in FIGS. 12A and 12B includes cathode active material layer 21, anode active material layer 22, solid electrolyte layer 23 arranged between the cathode active material layer 21 and the anode active material layer 22, cathode current collector 24 for collecting currents of the cathode active material layer 21, and anode current collector 25 for collecting currents of the anode active material layer 22. The cathode current collector 24 includes cathode tab 24*t* for being electronically connected to a cathode terminal (not illustrated), and the anode current collector 25 includes anode tab 25*t* for being electronically connected to an anode terminal (not illustrated).

The cathode active material layer contains at least a cathode active material, and may further contain at least one of a conductive material, an electrolyte and a binder. Examples of the cathode active material may include an oxide active material such as $LiNi_{1/3}Mn_{1/3}Co_{1/3}O_2$. Examples of the conductive material may include a carbon material. Examples of the electrolyte may include a solution electrolyte (liquid electrolyte) and a solid electrolyte. Examples of the liquid electrolyte may include an electrolyte in which Li salt such as $LiPF_6$ is dissolved in a carbonate-based solvent. Meanwhile, examples of the solid electrolyte may include an inorganic solid electrolyte such as a sulfide solid electrolyte, an oxide solid electrolyte, and a halide solid electrolyte; a gel electrolyte; and a polymer electrolyte. Examples of the binder may include a fluorine-based binder such as PVDF.

The anode active material layer contains at least an anode active material, and may further contain at least one of a conductive material, an electrolyte and a binder. Examples of the anode active material may include a Si-based active material such as a simple substance of Si, a Si alloy and a Si oxide; a graphite-based active material such as graphite; and an oxide active material such as lithium titanate. The Si-based active material may easily cause the breakage of the outer package since the volume change during charge and discharge is large, but the breakage of the outer package may be inhibited by using the above described outer package. The conductive material, the electrolyte and the binder to be used in the anode active material layer are in the same contents as those described above for the cathode active material layer.

The electrolyte layer contains at least an electrolyte, and may further contain a binder. The electrolyte and the binder are in the same contents as those described above for the cathode active material layer. When the electrolyte layer contains a solution electrolyte, the electrolyte layer may be a layer formed by impregnating a separator in the solution electrolyte. When the electrolyte layer contains a solid electrolyte, such a battery is generally called an all solid state battery. The battery in the present disclosure may be an all solid state battery.

The power generating element in the present disclosure comprises at least a power generating unit including a cathode active material layer, an electrolyte layer and an anode active material layer. In embodiments, the power generating element includes a plurality of the power generating unit arranged along with the thickness direction. The plurality of the power generating unit may be connected in series and may be connected in parallel.

3. Spacer

Figure 13A:
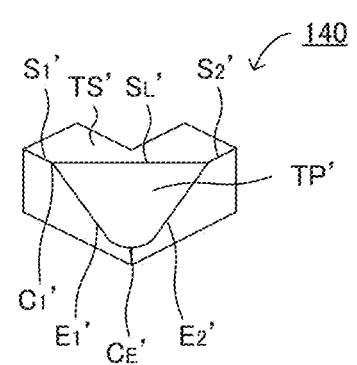
FIGS. 13A and 13B are schematic perspective views exemplifying the spacer in the present disclosure.
Figure 13B:
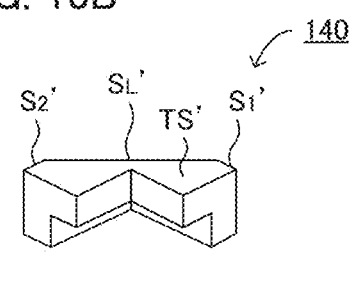

The battery in the present disclosure may include a spacer arranged to fill in a space between the power generating element and the outer package. In embodiments, the spacer includes a corresponding tapered surface capable of surface contact with the tapered surface in the outer package. The reason therefor is to further inhibit the generation of breakage in the corner of the convex structure. Here, FIG. 13A is a schematic perspective view exemplifying the spacer in the present disclosure, and FIG. 13B is a schematic perspective view of the spacer in FIG. 13A observed from back. As shown in FIG. 13A, spacer 140 includes corresponding tapered surface TP' capable of surface contact with the tapered surface (not illustrated) in the outer package.

The spacer 140 shown in FIGS. 13A and 13B will be described in details. The spacer 140 includes corresponding top surface TS'. In a plan view, the top surface TS' includes corresponding first side $S_1'$, corresponding second side $S_2'$ that extends to a direction crossing to the corresponding first side $S_1'$, and corresponding connection part $S_L'$ that connects the corresponding first side $S_1'$ and the corresponding second side $S_2'$. Also, in a plan view, the spacer 140 includes corresponding first extension part $E_1'$ that extends from corresponding first crossing part $C_1'$ where the corresponding connection part $S_L'$ and the corresponding first side $S_1'$ are crossed, corresponding second extension part $E_2'$ that extends from corresponding second crossing part $C_2'$ where the corresponding connection part $S_L'$ and the corresponding second side $S_2'$ are crossed, and corresponding extension crossing part $C_E'$ that connects the corresponding first extension part $E_1'$ and the corresponding second extension part $E_2'$. Also, the corresponding extension crossing part $C_E'$ is in a position lower than that of the corresponding top surface TS' in a thickness direction. Also, the spacer 140 comprises corresponding tapered surface TP' including the corresponding connection part $S_L'$, the corresponding first extension part $E_1'$, and the corresponding extension part $E_2'$ as an outer periphery.

Figure 14A:
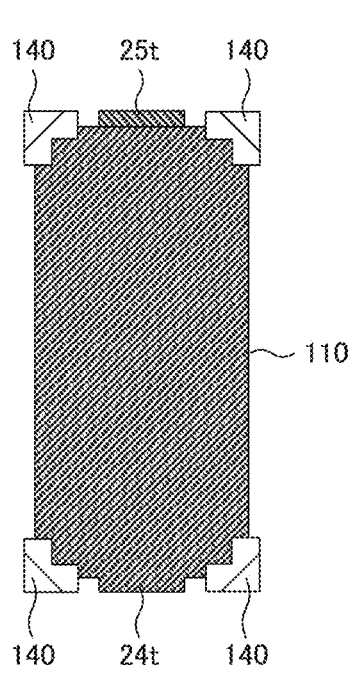
FIGS. 14A and 14B are schematic plan views exemplifying the power generating element, the spacer and the outer package in the present disclosure.
Figure 14B:
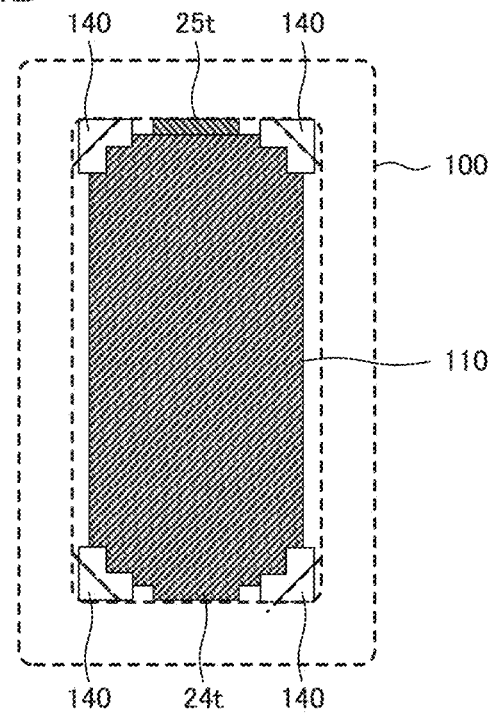

Also, as shown in FIGS. 14A and 14B, the tapered surface in the outer package 100 and the corresponding tapered surface in the spacer 140 are arranged to oppose to each other, in embodiments, so that the spacer 140 fills in the space between the power generating element 110 and the outer package 100.

Figure 15A:
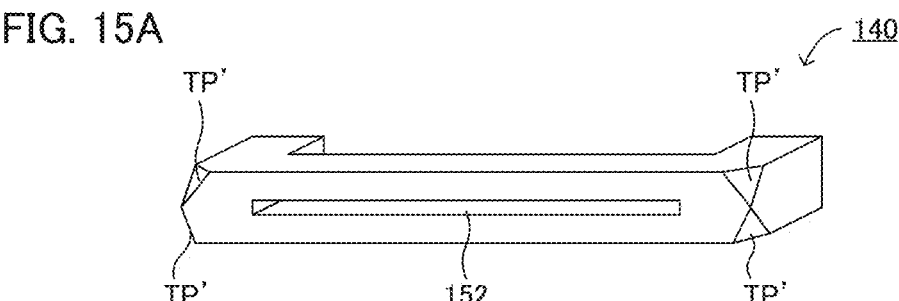
FIG. 15A is a schematic perspective view and FIG. 15B is a schematic side view, exemplifying the spacer in the present disclosure.
Figure 15B:
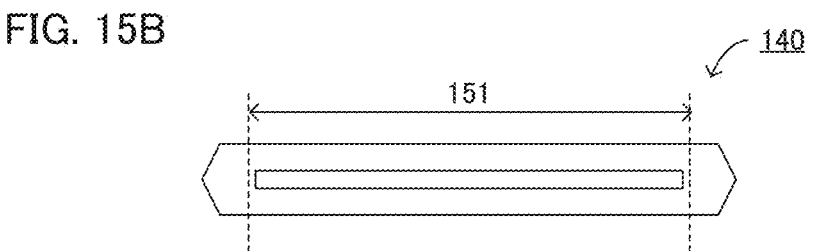

The spacer in the present disclosure may include a holder part that fixes the tab of the power generating element. In other words, the spacer and the holder may be integrated. Wrinkles in the tab is prevented from generating when the power generating element is sealed in the outer package, if the spacer includes the holder part. For example, the spacer 140 shown in FIGS. 15A and 15B includes a plurality of the corresponding tapered surface TP', and further includes holder part 151 that fixes the tab of the power generating element. In FIGS. 15A and 15B, penetrating part 152 that fixes the tab of the power generating element is formed, and the tab of the power generating element is fixed when a wall part configuring the penetrating part 152 limits the movement of the tab. The holder part may limit the movement of the tab in the thickness direction, may limit the movement of the tab in the vertical direction to the thickness direction, and may limit the movement of the tab in the thickness direction and the vertical direction to the thickness direction. Also, the holder part 151 may fix both of the tab of the power generating element, and an electrode terminal. In particular embodiments, the holder part 151 fixes a connecting part of the tab of the power generating element and the electrode terminal.

Figure 16:
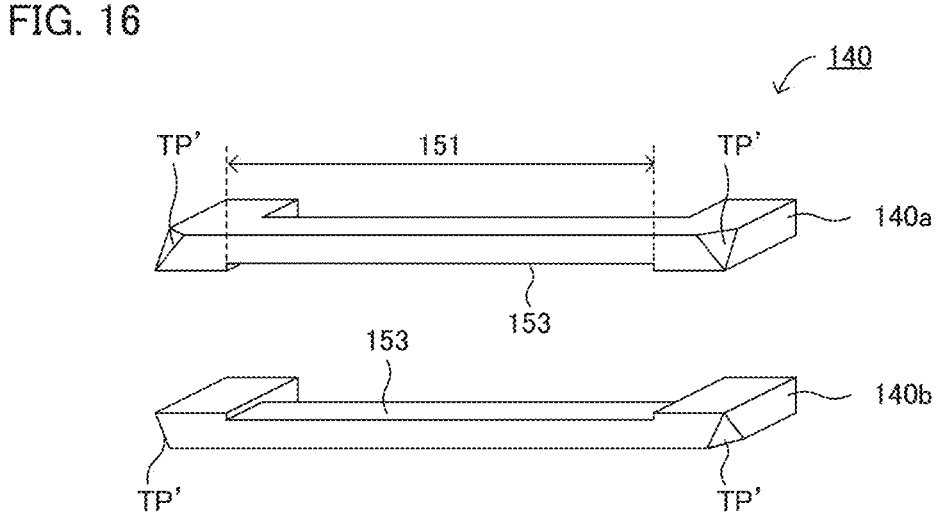
FIG. 16 is a schematic perspective view exemplifying the spacer in the present disclosure.

Also, as shown in FIG. 16, the spacer 140 including the holder part 151 may be divided into two in the thickness direction. In other words, the spacer 140 may include a pair of members, first member 140a and second member 140b. In each of the first member 140a and the second member 140b shown in FIG. 16, notch part 153 that fixes the tab of the power generating element is formed. By arranging a pair of the notch part 153, a wall part configuring the notch part 153 limits the movement of the tab, and thereby the tab of the power generating element is fixed. Incidentally, the first member 140a and the second member 140b may not include the notch part 153.

Figure 17:
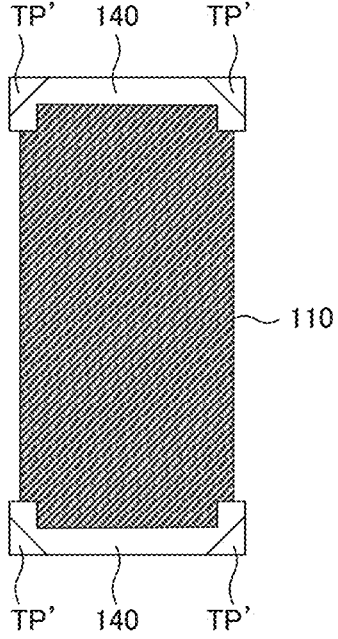
FIG. 17 is a schematic plan view exemplifying the power generating element and the spacer in the present disclosure.

Also, as shown in FIG. 17, the spacer 140 including the holder part 151 is arranged so that the tapered surface (not illustrated) in the outer package opposes to the corresponding tapered surface TP' in the spacer 140, while fixing the tab of the power generating element 110.

4. Battery

The battery in the present disclosure usually includes a cathode terminal connected to a cathode tab, and an anode terminal connected to an anode tab. One edge of each of the cathode terminal and the anode terminal is arranged outside the outer package, and the other edge is arranged inside the outer package. For the cathode terminal and the anode terminal, known electrode terminals may be used. Also, the battery in the present disclosure is typically a lithium ion secondary battery. There are no particular limitations on the method for producing the battery in the present disclosure, and examples thereof may include a method in which a power generating element with electrode terminals attached is stored inside an outer package, and the outer package positioned around the power generating element stored is heat-sealed under reduced pressure atmosphere to be thermally welded.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

Figure 18A:
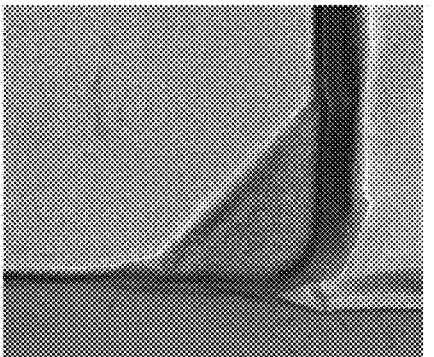
FIGS. 18A and 18B are pictures of the outer packages produced in Example and Comparative Example.

A laminate film, and metal molds (male mold and female mold) with shapes corresponding to a tapered surface formed, were prepared. To the laminate film, an emboss processing was conducted using the metal molds, and thereby an outer package was obtained. As shown in FIG. 18A, intended tapered surface was formed in the obtained outer package.

Next, a power generating element was produced using $LiNi_{1/3}Mn_{1/3}Co_{1/3}O_2$ as a cathode active material, $Li_4Ti_5O_{12}$ as an anode active material, and $Li_2S$—$P_2S_5$-based sulfide solid electrolyte as a solid electrolyte. The obtained power generating element was arranged in the outer package together with a spacer including a corresponding tapered surface capable of surface contact with the tapered surface of the outer package, and a part of the outer package positioned around the power generating element was sealed under reduced pressure atmosphere to obtain a battery.

Comparative Example 1

Figure 18B:
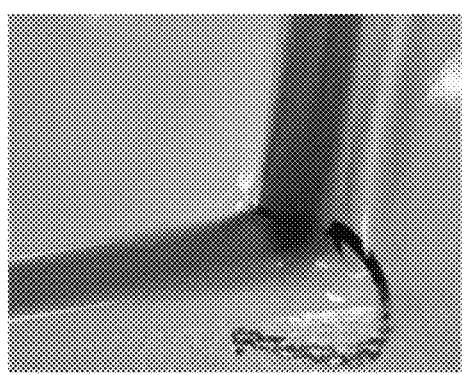

An outer package was obtained in the same manner as in Example 1, except that metal molds (male mold and female mold) without the shape corresponding to the tapered surface was used. As shown in FIG. 18B, a tapered surface was not formed in the obtained outer package. A battery was obtained in the same manner as in Example 1 except that the obtained outer package was used and a conventional spacer without a tapered surface was used.

[Evaluation]

Heat shock tests were conducted to the batteries obtained in Example 1 and Comparative Examples 1 in the condition of −15° C. to 95° C. As a result, a hole was confirmed in the top of the convex structure in Comparative Example 1 after 35 cycles. On the other hand, breakage of the outer package was not confirmed in Example 1 even after 1600 cycles. In this manner, it was confirmed that the generation of breakage in the corner of the convex structure was inhibited in the outer package when the tapered surface was arranged.

REFERENCE SIGNS LIST 1 thermally weldable layer
2 metal layer
3 resin layer
10 space
20 convex structure
100 outer package
110 power generating element
120 cathode terminal
130 anode terminal
140 spacer
200 battery

What is claimed is:
1. A battery comprising:
a power generating element having a cathode active material layer, an anode active material layer, a solid electrolyte layer arranged between the cathode active material layer and the anode active material layer, a cathode current collector having a cathode tab, and an anode current collector having an anode tab;

a laminate-type outer package sealing the power generating element, the laminate-type outer package comprising:
a convex structure including a space to seal the power generating element; wherein the convex structure includes a top surface;
in a plan view, the top surface includes a first side, a second side that extends to a direction crossing to the first side, and a connection part that connects the first side and the second side;
in a plan view, the outer package includes a first extension part that extends from a first crossing part where the connection part and the first side are crossed, a second extension part that extends from a second crossing part where the connection part and the second side are crossed, and an extension crossing part that connects the first extension part and the second extension part;
the extension crossing part is in a position lower than that of the top surface in a thickness direction; and
the outer package includes a tapered surface including the connection part, the first extension part and the second extension part as an outer periphery; and
at least one spacer arranged to fill in a space between the power generating element and the outer package;
wherein the tapered surface includes a mountain fold part having a fold that is either:
connected to the connection part and spaced from the first extension part and the second extension part at the connection part, or
connected to the first extension part and the second extension part and spaced from the connection part;
wherein the at least one spacer includes a concave portion configured to fit a first corner and a second corner of the power generating element;
wherein the first corner is disposed in the concave portion and includes portions of the cathode active material layer, the solid electrolyte layer, and the cathode current collector;
wherein the second corner is disposed in the concave portion and includes portions of the anode active material layer, the solid electrolyte layer and the anode current collector;
wherein the at least one spacer includes a corresponding tapered surface capable of surface contact with the tapered surface in the outer package, the tapered surface and the corresponding tapered surface are arranged to oppose each other; and
wherein the at least one spacer includes a holder part that fixes at least one of the cathode tab or the anode tab of the power generating element.
2. The battery according to claim 1, wherein the connection part includes a straight line part in a plan view.
3. The battery according to claim 1, wherein, in a plan view, the first side and the first extension part are parallel, and the second side and the second extension part are parallel.
4. The battery accordingly to claim 1, wherein the mountain fold part of the tapered surface includes one edge connected to the connection part and another edge connected to the extension crossing part.
5. The battery accordingly to claim 1, wherein the mountain fold part of the tapered surface includes one edge connected to the first extension part and another edge connected to the second extension part.
6. The battery accordingly to claim 1, wherein the corresponding tapered surface of the at least one spacer decreases in thickness.

7. The battery according to claim 1, wherein the fold of the mountain fold part is connected to the first extension part and the second extension part and spaced from the connection part.

8. The battery according to claim 1, wherein the fold of the mountain fold part is connected to the connection part and spaced from the first extension part and the second extension part at the connection part.

9. The battery according to claim 1, wherein the mountain fold part is different from the first extension part and the second extension part.

10. A battery comprising:

a power generating element;

a laminate-type outer package sealing the power generating element, the laminate-type outer package comprising:

a convex structure including a space to seal the power generating element; wherein the convex structure includes a top surface;

in a plan view, the top surface includes a first side, a second side that extends to a direction crossing to the first side, and a connection part that connects the first side and the second side;

in a plan view, the outer package includes a first extension part that extends from a first crossing part where the connection part and the first side are crossed, a second extension part that extends from a second crossing part where the connection part and the second side are crossed, and an extension crossing part that connects the first extension part and the second extension part;

the extension crossing part is in a position lower than that of the top surface in a thickness direction; and the outer package includes a tapered surface including the connection part, the first extension part and the second extension part as an outer periphery; and a spacer arranged to fill in a space between the power generating element and the outer package;

wherein the spacer includes a corresponding tapered surface capable of surface contact with the tapered surface in the outer package, the tapered surface and the corresponding tapered surface are arranged to oppose each other;

wherein the tapered surface includes a mountain fold part, the mountain fold part having a first tapered surface and a second tapered surface formed by the mountain fold part within the outer periphery;

wherein the mountain fold part of the tapered surface includes a fold between the first tapered surface and the second tapered surface; and wherein the spacer includes a holder part that fixes a tab of the power generating element.

11. The battery according to claim 10, wherein the connection part includes a straight line part in the plan view.

12. The battery according to claim 10, wherein, in a plan view, the first side and the first extension part are parallel, and the second side and the second extension part are parallel.

13. The battery according to claim 10, wherein the mountain fold part of the tapered surface includes one edge connected to the connection part and another edge connected to the extension crossing part.

14. The battery according to claim 10, wherein the mountain fold part of the tapered surface includes one edge connected to the first extension part and another edge connected to the second extension part.

15. The battery according to claim 10, wherein the corresponding tapered surface of the spacer decreases in thickness.

16. The battery according to claim 10, wherein the spacer includes a concave portion configured to fit a corner of the power generating element.

17. The battery according to claim 10, wherein the fold of the mountain fold part is connected to the first extension part and the second extension part and spaced from the connection part.

18. The battery according to claim 10, wherein the fold of the mountain fold part is connected to the connection part and spaced from the first extension part and the second extension part at the connection part.

19. The battery according to claim 10, wherein the mountain fold part is different from the first extension part and the second extension part.

* * * * *